(No Model.)
R. A. SIMPSON.
HAY RAKE AND STACKER.
No. 602,145.
2 Sheets—Sheet 1.
Patented Apr. 12, 1898.
Fig: 1
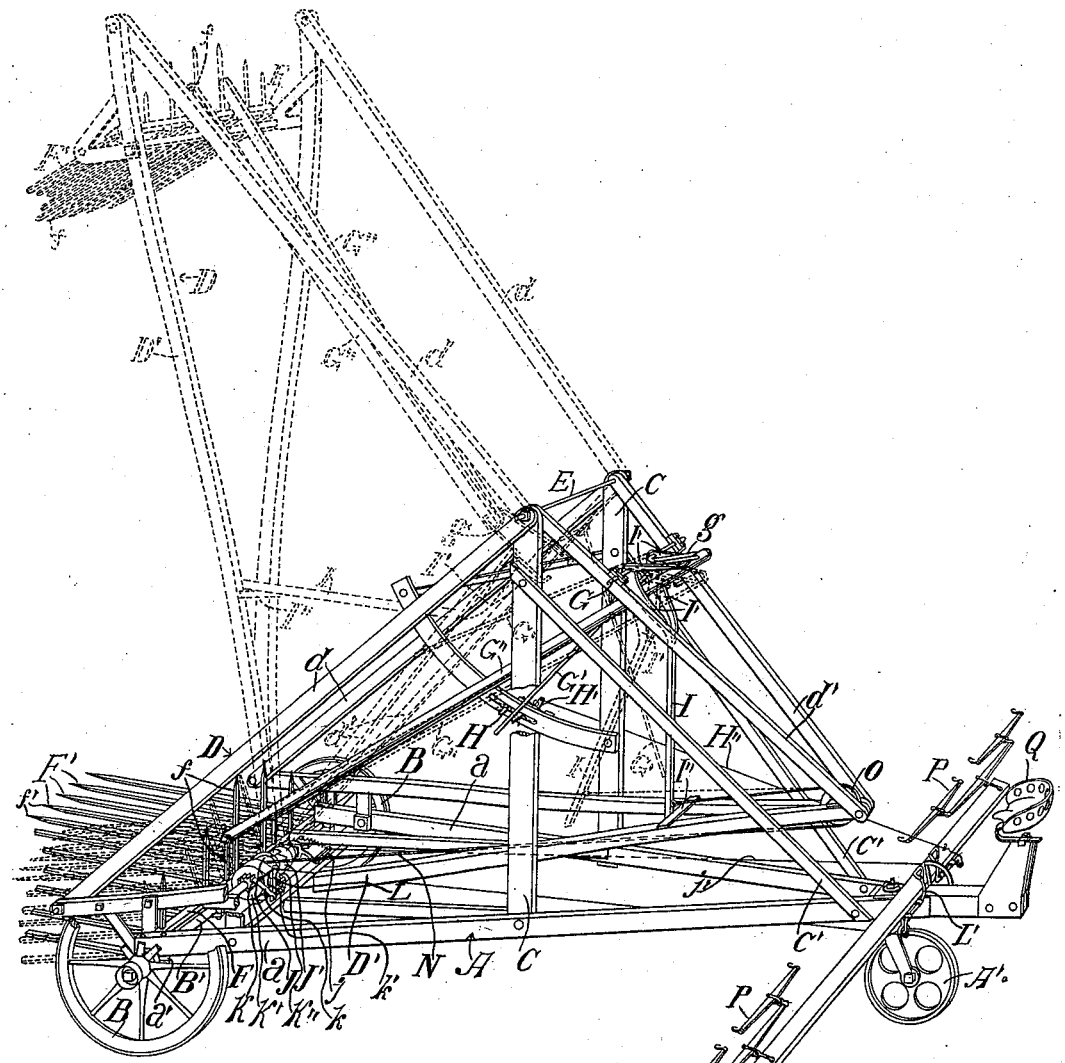
Witnesses:
F. T. Johnson.
Alfred I. Townsend.
Inventor:
Rufus A. Simpson
by Hazard & Townsend
his attys.

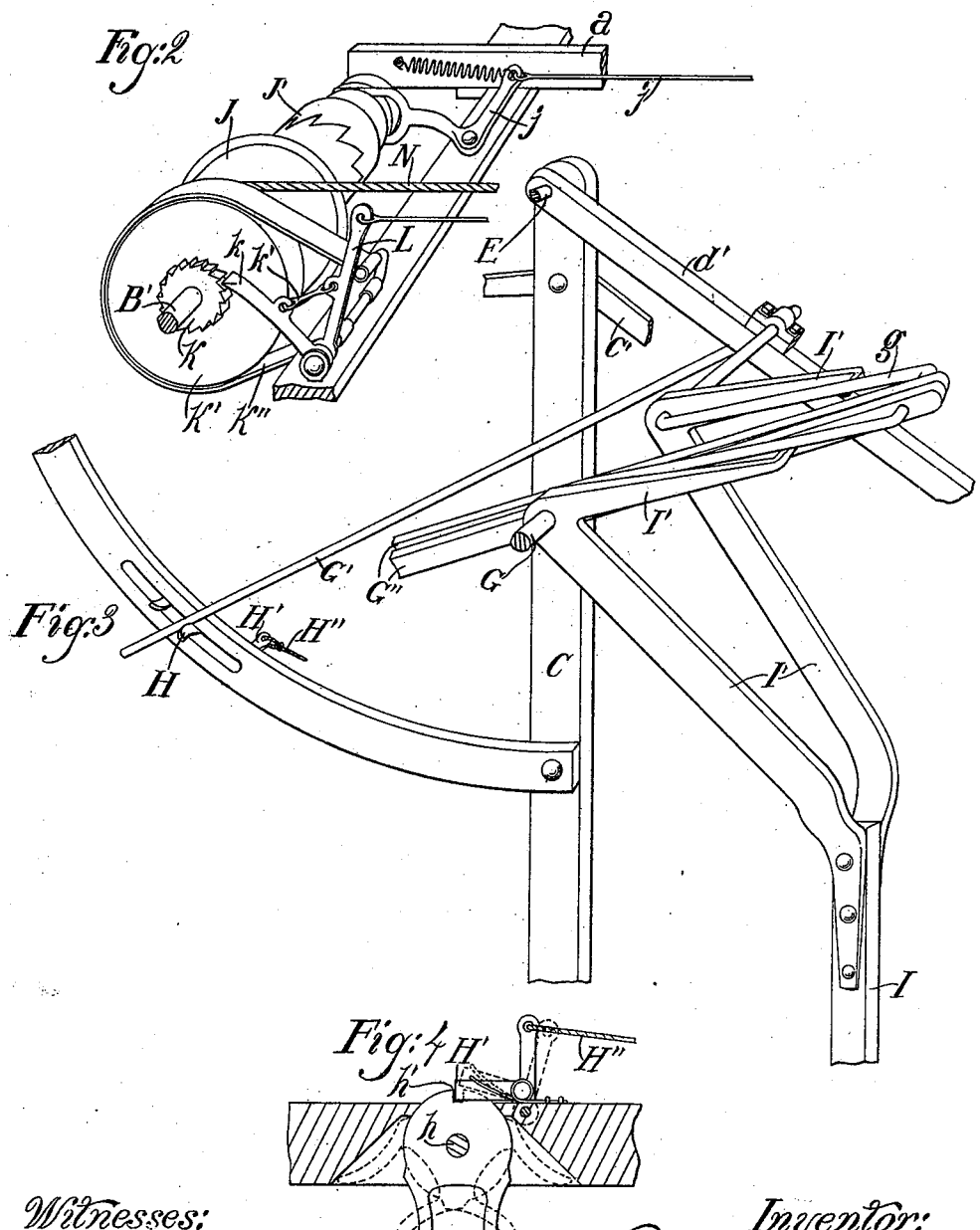

UNITED STATES PATENT OFFICE.

RUFUS A. SIMPSON, OF FLORENCE, CALIFORNIA.

HAY RAKE AND STACKER.

SPECIFICATION forming part of Letters Patent No. 602,145, dated April 12, 1898.

Application filed September 18, 1896. Serial No. 606,264. (No model.)

*To all whom it may concern:*

Be it known that I, RUFUS A. SIMPSON, a citizen of the United States, residing at Florence, in the county of Los Angeles and State of California, have invented new and useful Improvements in Hay Rakes and Stackers, of which the following is a specification.

My invention relates particularly to that class of devices which are designed to rake and carry cured hay from the field to the place of stacking and by horse-power to operate the device to elevate the hay and place it upon the stack.

The object of my invention is to provide a device of this kind which will be cheap and simple, will be easy to operate, one in which all manipulating of the machine will be done through the application of horse-power regulated by the driver through means of suitable clutches and brakes, and in which the hay may be raked, carried any distance desired, elevated, and deposited in position upon a stack of considerable height, where it may be properly arranged by men employed for that purpose.

My invention comprises the features of construction and combinations of parts hereinafter fully set forth and claimed, whereby I accomplish the objects above set forth.

The accompanying drawings illustrate my invention.

Figure 1 is a perspective side elevation of a device embodying my invention. In this view dotted lines indicate the position of the machine when a load of hay has been elevated and dumped upon the stack and before the clutch mechanism has been released to allow the elevator to return to its normal position. Fig. 2 is a fragmental detail showing my improved arrangement of ratchet and brake as applied to the drum which operates the pivoted swinging elevator-frame. Fig. 3 is a fragmental detail of my improved adjusting-lever and the crank-shaft whereby I regulate the position of the points of the rake-teeth. Fig. 4 is a fragmental detail illustrating my improved trip-guide which guides the crank-arm which regulates the position of the teeth and holds them practically horizontal during the upward movement of the elevating-frame.

In the drawings, A represents a base or supporting frame, which is preferably triangular in shape, as shown, and is provided at its front end with supporting-wheels B, which are rigidly secured to a supporting-axle B', or, if desired, attached thereto with ordinary ratchet connections, so that when driven forward the wheels will rotate the axle and when driven backward will rotate upon the axle. Such construction is commonly employed in mowing-machines and is not of my invention, and therefore illustration thereof is unnecessary herein. Upon this axle B' the side members $a$ of the frame are supported by journal-boxes $a'$, in which the axle is journaled. The rear end of the frame is supported upon a swivel-wheel A'. Substantially midway of the frame I provide upwardly-projecting supporting-standards C, which are braced by means of supporting-rods C' to prevent them from being pulled forward when power is applied to elevate the hay to be stacked.

D is a movable swinging elevator and carrier-frame which is pivotally suspended from the upper portion of the uprights C and carries the rake and operates to elevate the hay. This frame is preferably triangular, as shown, and its base members D' project in front of the supporting-wheels B. The front ends of the side members $d$ are secured to the front end of the frame D, and their other ends are pivotally secured to the uprights C by means of a supporting rod or shaft E, which passes through both uprights, as shown. The rear members $d'$ of the frame D are pivotally secured upon the inside of the uprights, and the members $d$ are secured upon the outside of such uprights. The base members D' are also arranged inside the uprights. Thus the frame is free to swing forward between the uprights, and yet the front members $d$ are arranged far enough apart at their pivotal points to act as an efficient brace for the front end of the frame D to prevent it from racking sidewise when strain is applied to the rake by reason of the frame swinging to elevate the hay.

To the front end of the frame D, I pivotally secure a frame F, to which is attached the rake-teeth F' and upwardly-projecting arms $f$. To the members $d'$ of the frame I pivotally secure a crank-shaft G, which is provided at one end with a crank-arm G'. An adjusting-rod G'' is pivoted at one end upon the crank $g$ of the crank-shaft, and, as shown, is divided at its front end and its two members pivotally secured to the arms $f$, which are attached to the frame F. Thus any movement of the crank $g$ operates to swing the frame F and to adjust the position of the rake-teeth with relation to the horizon.

In order to provide means whereby the rake-teeth will be held in a practically horizontal position as the movable frame D is swung forward upon its pivots, to thus elevate the front end of the frame and the rake to carry the load upward, I provide a guide H, which is secured to the frame A and is adapted to receive and guide the crank-arm G' as the frame is swung forward. This guide is of U shape, is pivotally secured to the frame by means of a pivot $h$, and is adapted to swing in either direction to release the crank-arm G'.

The body of the guide is provided with a notch $h'$, into which seats a dog H' when the guide is in its normal position, as indicated in solid lines in Fig. 4. This dog is operated by means of a rope H'' or any other suitable device to release the guide and allow the crank-arm G' to become disengaged therefrom when it is desired to allow the rake-teeth to tilt to rake the hay or to dump it upon the stack, as the case may be.

Upon the crank-shaft G, I pivot an adjusting-lever I, which, as shown, is bifurcated and is provided with arms I', which are adapted to engage with the crank $g$ of the crank-shaft and to partially rotate the same when the lever is swung upon its pivot. Upon the axle B' is journaled a drum J and is also arranged a clutch J', which is adapted to connect and disconnect the drum with the axle, so that the drum may be caused to rotate with the axle or may be disengaged therefrom to rotate freely upon the axle. The clutch is operated by means of a lever $j$ and a connecting-rod $j'$. Upon one end of the drum is provided a ratchet-wheel K and a friction-disk K', with which a friction brake or band K'' is adapted to engage. A pawl $k$ is adapted to engage with the ratchet-wheel K, and a connecting-rod $k'$ connects the brake-operating crank L with the pawl, and the brake and pawl are so arranged with relation to each other that when the lever L' is operated to set the brake it releases the pawl $k$ from the ratchet-wheel K before the brake K'' is brought into engagement with the friction-disk K', so that the drum J will then be free to rotate until the lever L' is actuated sufficiently to carry the brake into engagement with the friction-disk or released to allow the pawl to again engage the ratchet-wheel.

A suitable flexible connection, such as the cable N, has one end wound about the drum and its other end passed to the rear and attached to the rear end of the frame D, so that when the cable is wound upon the drum the frame will be swung forward.

In order to provide means whereby the points $f'$ of the teeth may be raised by horse-power after they have been lowered and the hay raked or gathered thereupon, I run this flexible connection N over a pulley O, journaled in the rear end of the frame D, pass it forward, and secure it to the lower end of the adjusting-lever I. A stop I'' is secured to the frame D to limit the rearward movement of the adjusting-lever I. This stop is so arranged with relation to the crank-arm G', the crank $g$, and the guide H that when the crank-arm is in place in the guide the lever I will be in engagement with the stop; but when the crank-arm is released from the guide to allow the rake-teeth to be lowered to rake the hay the arm will swing to the rear, and by reason of the crank $g$ being in engagement with the adjusting-lever I the lever will be swung forward away from the stop, as indicated in dotted lines in Fig. 1.

In practice horses are attached to the whiffletrees P in a manner similar to that employed in headers, and the driver takes his position upon the seat Q. The clutch J' is disengaged from the drum J, the brake and pawl are both released from the drum, the dog H' is tripped to release the pivoted guide H, and the weight of the rake-teeth causes the points of such teeth to drop down into position to rake the hay, thus swinging the crank-arm G' to the rear, and also swinging the adjusting-lever I toward the front. These various positions are indicated in dotted lines in Fig. 1. The driver then drives the team forward, the supporting-axle rotating freely within the drum, and the hay is raked upon the teeth. When a sufficient load has been gathered or raked, the clutch J' is thrown into engagement with the drum J, and as the drum rotates it winds thereupon the flexible connection or cable N. The cable operates upon the adjusting-lever I and pulls such lever toward the rear, thus bringing the arms I' into engagement with the crank $g$, throwing such crank upward, thus acting upon the connecting-rod G'' and the crank-arms $f$ to swing the frame F upon its pivot to elevate the rake-teeth and bring the lever I into engagement with the stop I'', as shown in solid lines in Fig. 1. As the crank is thus moved upward the crank-arm G' is swung downward and enters the open mouth of the U-shaped guide H, which mouth is always presented toward that side upon which the crank-arm emerges from the guide, and further onward movement of the arm carries the guide back into its normal position, and the dog drops into position and locks the guide and crank-arm against further movement. When the adjusting-lever I engages the stop I'', any further rotation of the drum operates to swing the frame D forward and to elevate the hay upon the rake-teeth. If it is necessary to transport the hay any distance to be stacked, if not previously done, the lever L' is actuated to throw the pawl $k$ into engagement with the ratchet-wheel K, thus to prevent a reverse movement of the drum J.

Then the clutch J' is thrown out of engagement with the drum, and the driver drives the team to carry the load to the point where it is to be stacked. When a point sufficiently near to the stack is reached, the clutch J' is thrown into engagement with the drum, and the horses are driven forward, thus winding the flexible connection N upon the drum and pulling upon the rear end of the frame D, thus drawing such rear end forward and elevating the front end of the frame D into the position shown in dotted lines in Fig. 1. As the frame swings upward the crank-arm G' slides in the guide H, and thus operating the crank g so as to hold the rake-teeth always in a horizontal position. After the hay has been elevated as shown, then the guide H is released by pulling upon the rope attached to the dog H', and the crank-arm swings toward the rear, thus allowing the teeth to tilt downward and to drop the hay upon the stack.

If the driver should fail to calculate the distance properly and the frame is fully elevated before reaching the stack, the clutch J' may be disengaged from the drum and the pawl k will prevent the drum from rotating. Then as the device is pushed forward by the team the driving-axle freely rotates within the drum and the stacker can be driven close to the stack. When the rake-teeth are in proper position above the stack, the guide H is tripped, thus allowing the crank-arm G' to swing downward and permitting the rake-teeth to tilt downward, so that the hay will slide therefrom onto the stack. Then the team is backed to carry the stacker a short distance away from the stack, the lever L' is actuated to disengage the dog k from the ratchet K and to bring the brake K'' into engagement with the friction-disk K', and the tilted frame is allowed to slowly resume its normal position. By operating the brake-lever L' quickly the brake will catch the drum before the frame gains any appreciable momentum, and the frame can be easily controlled during its descent. When the frame has resumed its normal position, the device is again driven to the field, another load of hay gathered upon the teeth, and then elevated in the manner just described.

Now, having described my invention, what I claim as new, and desire to secure by Letters Patent, is—

1. A combined rake and stacker comprising a wheel-supported frame having upwardly-projecting standards; a swinging frame pivoted to said standards and carrying at its front end pivoted hay raking and carrying teeth; a crank-shaft journaled to the swinging frame and provided with a projecting crank; an adjusting-rod connecting the crank with the teeth; a guide secured to the stationary frame and adapted to receive and guide the crank-arm; a drum adapted to be operated by the rotation of the supporting-wheels; a flexible connection wound about the drum, passed to the rear and secured to the rear end of the swinging frame; suitable clutch and brake mechanism adapted to connect and disconnect the drum with the supporting-wheels; and means for releasing the crank-arm to allow the rake-teeth to tilt.

2. In a hay rake and stacker, the combination set forth of the wheel-supported base-frame; the uprights secured to such frame; the swinging frame comprising two base members secured together in V shape, front supporting members secured to the front of the V-shaped base diverging upward therefrom and pivotally secured to the uprights, rear supporting members secured to the rear end of the V-shaped base diverging forwardly and outwardly and pivotally secured to the uprights; rake-teeth pivotally secured to the front end of the swinging frame; and means adapted to swing the frame on its pivotal support to elevate the rake-teeth.

3. A combined hay rake and stacker comprising a triangular frame provided with upwardly-projecting standards and supported at its front end upon an axle; supporting-wheels mounted upon and adapted to rotate such axle; a swivel-wheel supporting the rear end of the frame; a triangular swinging frame pivoted to the top of the standards; rake-teeth pivotally secured to the front end of the swinging frame; a crank-shaft carried by the swinging frame; an adjusting-rod connecting the rake-teeth with the crank-shaft; suitable means for operating the crank-shaft to hold the rake-teeth approximately horizontal as the swinging frame is swung forward to carry its front end upward; a drum adapted to be operated by the rotation of the supporting-axle; a flexible connection wound upon the drum and secured to the rear end of the swinging frame; a clutch adapted to connect and disconnect the drum with the supporting-axle; and a brake adapted to control the movement of the drum.

4. A hay rake and stacker comprising the combination of a frame mounted upon an axle and provided with upwardly-projecting standards; wheels secured upon the axle and adapted to rotate it; a swinging frame pivoted to the top of the standards; a crank-shaft journaled to the swinging frame and provided with a projecting crank-arm; a trip-guide secured to the fixed frame and adapted to guide the crank-arm while the swinging frame is being swung upon its pivots; an adjusting-rod connecting the crank-shaft with the rake-teeth; an adjusting-lever pivoted upon the crank-shaft and provided with projecting arms adapted to engage the crank to partially rotate it to adjust the rake-teeth; a stop secured to the swinging frame and adapted to limit the movement of the adjusting-lever; a drum journaled upon the supporting-axle; a clutch adapted to connect and disconnect the drum with the axle; a brake adapted to control the movement of the drum; a flexible connection wound about the drum, passed to the rear, over a pulley journaled in the movable frame, and thence forward and secured to the adjusting-lever; and means for operating the trip-guide.

5. A hay rake and stacker comprising the combination set forth of a V-shaped base-frame supported upon an axle; suitable supporting-wheels arranged upon and adapted to rotate the axle; a swivel-wheel arranged to support the rear end of the base-frame; upwardly-projecting standards secured to the frame; a swinging frame pivotally secured to the top of the standards; rake-teeth pivotally secured to the front end of the swinging frame; a crank-shaft pivoted to the swinging frame; an adjusting-rod connecting the crank-shaft with the rake-teeth, adapted to adjust the rake-teeth and provided with a crank-arm; a U-shaped guide pivoted to the base-frame and adapted to receive and guide the crank-arm; a trip-clutch adapted to engage the guide to hold it in position to guide the crank-arm and to be tripped to allow the guide to release the arm; an adjusting-lever pivoted upon the crank-shaft and provided with a projecting arm adapted to engage the crank to adjust the rake-teeth; a drum journaled upon the supporting-axle; a clutch adapted to connect and disconnect the drum with the supporting-axle; a brake adapted to control the movement of the drum; and a flexible connection wound about the drum, passed to the rear over a supporting-pulley journaled in the movable frame, thence forward and secured to the adjusting-lever.

6. In a hay rake and stacker the trip-guide set forth comprising a U-shaped member pivotally secured to a support; and a dog adapted to engage such member to lock it in position or to be released to allow the guide to swing with its mouth open in either direction.

RUFUS A. SIMPSON.

Witnesses:
ALFRED I. TOWNSEND,
JAMES R. TOWNSEND.